United States Patent [19]

Hizny

[11] Patent Number: 5,048,938
[45] Date of Patent: Sep. 17, 1991

[54] MONOLITHIC LASER SPATIAL FILTER

[75] Inventor: John J. Hizny, North Billerica, Mass.

[73] Assignee: United Technologies Corporation, Hartford, Conn.

[21] Appl. No.: 535,261

[22] Filed: Jun. 8, 1990

[51] Int. Cl.⁵ ............................ G02B 3/02; G02B 6/32
[52] U.S. Cl. ....................................... 359/652; 385/33
[58] Field of Search ................. 350/413, 96.15, 96.18, 350/96.20

[56] References Cited

U.S. PATENT DOCUMENTS

| | | | |
|---|---|---|---|
| 4,381,137 | 4/1983 | Berg et al. | 350/96 |
| 4,634,233 | 1/1987 | Usami et al. | 350/413 |
| 4,641,927 | 2/1987 | Prescott et al. | 350/413 |
| 4,668,053 | 5/1987 | Nishi et al. | 350/413 |
| 4,690,555 | 9/1987 | Ellerbroek | 356/121 |
| 4,810,069 | 3/1989 | Kobayashi | 350/413 |
| 4,832,446 | 5/1989 | Miyagawa | 350/162 |

*Primary Examiner*—Scott J. Sugarman
*Assistant Examiner*—James Phan

[57] ABSTRACT

A monolithic optical device formed from a GRIN rod having a centered aperture at an exit end thereof is bonded to a laser exit face to couple laser radiation through a spatial aperture without the alignment sensitivity characteristic of the prior art by the sequence of fabrication and alignment steps, whereby the output beam from the spatial filter is essentially subject only to vignetting as a result of misalignment of the optic with respect to the laser beam, rather than to the distorted wavefront characteristic of such misalignment in the prior art.

5 Claims, 1 Drawing Sheet

MONOLITHIC LASER SPATIAL FILTER

DESCRIPTION

1. Technical Field

The field of the invention is that of generating and manipulating optical beams.

2. Background Art

In many optical systems, the art has a need to "clean up" an optical beam by eliminating radiation that diverges from the central axis. The standard method is to focus the beam to a narrow beam waist and then pass that beam waist through a hole in an opaque material, referred to as a spatial filter. The stray radiation is blocked by the material and the desired radiation passes through the hole. This process is applied to lasers of all types, gas lasers, such as HeNe and solid state lasers, such as laser diodes.

Workers in the field have used discrete glass lenses and an adjustable metal aperture to perform spatial filtering. These devices are difficult to align initially and require periodic realignment due to drift between the components, which results in both a loss of transmitted power and the introduction of unwanted aberrations or distortions.

U.S. Pat. No. 4,832,446 illustrates a conventional spatial aperture system, in which a laser beam is first focused through an aperture by a first lens and then collimated by a second lens. A particular form of lens, which is usually used for coupling light into and out of optical fibers is shown in U.S. Pat. Nos. 4,634,233 and 4,668,053 which illustrate a GRIN lens which is a gradient index refractive lens that has the property that the index of refraction changes as a function of increasing radius in such a manner as to focus the beam or otherwise perform an optical function. Both these patents illustrate GRIN lenses that are used to collimate the output of a laser. In each case, the laser emits radiation which travels through free space in what is conventionally called a free-space mode that enters the lens and is collimated. There is, of course, a loss of optical power in the transition from the laser to the lens and also in reflection off the lens surface. There is a further loss of power in coupling from the wave guide mode of optical power that is present within the semiconductor laser to the free space radiation.

The art has sought a method of spatial filtering that could be used to clean up a laser beam with minimal loss of power and also to reduce the sensitivity of prior art methods to misalignment.

DISCLOSURE OF INVENTION

The invention relates a monolithic combination of lens and spatial filter that is coupled closely, such as by gluing, to a laser and focuses the output of the laser to a narrow beam waist at the aperture of a spatial filter, and to a method of fabricating and aligning the combination. From this aperture, the exiting beam diverges with a high quality spherical wave front surface.

A feature of the invention is the alignment of the limiting pupil with respect to the laser beam, not the alignment of the spatial aperture with respect to the beam waist.

Other features and advantages will be apparent from the specification and claims and from the accompanying drawing which illustrates an embodiment of the invention.

BEST MODE FOR CARRYING OUT THE INVENTION

Figure 1:
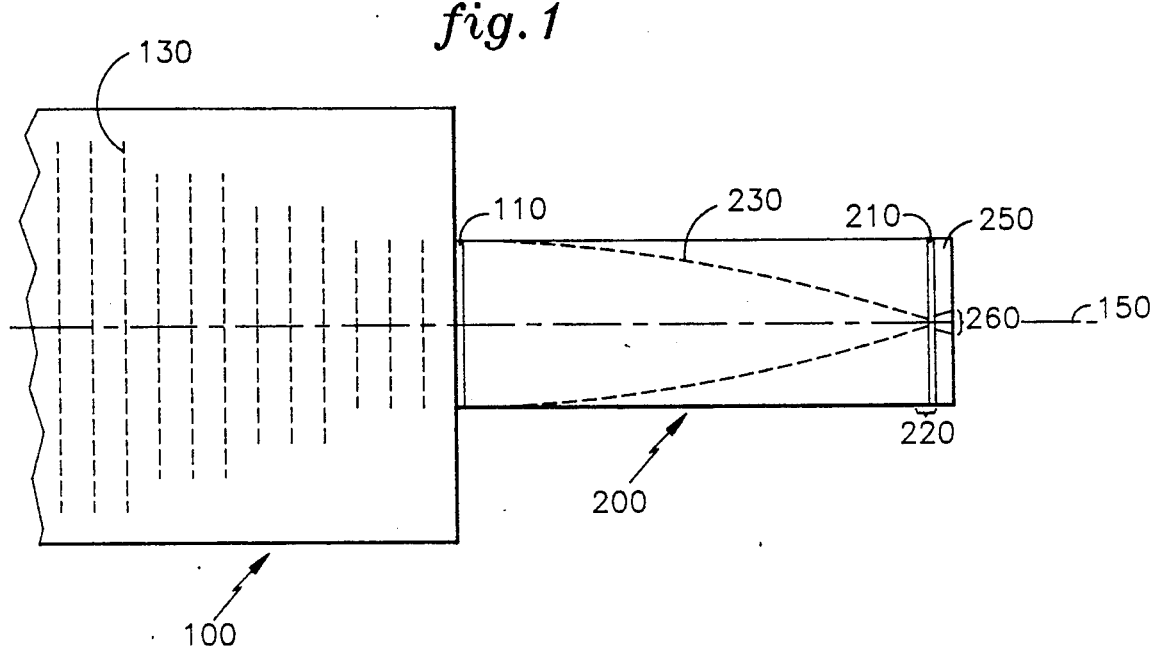
FIG. 1 illustrates in partially schematic, partially pictorial form an embodiment of the invention.

Referring now to FIG. 1, laser 100 at the left, generates radiation 130 denoted as a series of parallel lines that oscillate back and forth within the ends of laser 100, as is well known in the art. A portion of the radiation is emitted from the laser, traveling towards the right along beam axis 150. It enters GRIN lens 200 where it is denoted by the symbol 230, shown by two approaching lines which mark the outer limits of the radiation envelope. The GRIN lens is sized such that the radiation is brought to a focus at the right-hand end. The left-hand end is referred to as the first surface, closer to the laser and the right-hand end is referred to the second surface.

At the second surface, the beam waist denoted by the bracket labelled 220, passes through an aperture denoted by a bracket labeled 260, which is an opening in aperture plate 250. The opening 260 is sized with respect to the beam as will be disclosed below. As a further improvement, antireflection coatings 110 and 210, constructed in accordance with the wavelength of the laser in question, are placed on the first surface and second surface.

Aperture 260 is sized to clip the beam at or about the first minimum of the Airy disk. In the prior art, the aperture was separate from the lens and was aligned after the lens was aligned to the beam. With this procedure, a lateral misalignment of the aperture of even half the radial difference between the first Airy minimum and the second maximum would permit the passage of a significant amount of the radiation in the second Airy maximum, with consequent degradation of the beam quality. Axial misalignment would likewise produce output beam degradation due to the fact that the aperture would be intercepting the focused beam inside or outside the optimum beam waist position.

Figure 2:
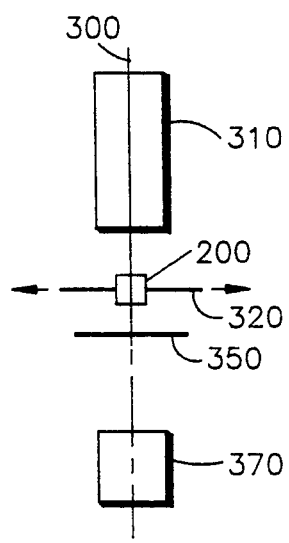
FIG. 2 illustrates in partially schematic, partially pictorial form an apparatus for fabricating the embodiment of FIG. 1.

According to the invention, the second face of the Grin rod 200 is coated with chrome layer 250 having a nominal thickness of 1,000 Å, by sputtering or any other convenient method. Layer 250 is coated with photoresist and mounted in a three-axis measuring microscope such as a Nikon UM-2. The GRIN is centered on axis 300 in the microscope, denoted schematically by box 310 in FIG. 2, with the second face down and aligned with mask 350. A conventional positioner 320 is used to align the GRIN with axis 300. The photoresist is exposed by illuminating it from below. After conventional development and stripping steps, the exposed center spot of the chrome layer is etched, leaving a 3 micron aperture 260 at the end of rod 200 that is concentric with the GRIN to the degree desired, illustratively 1 micron.

For the attachment step, the GRIN is placed in a conventional five-axis positioner positioned adjacent to the exit window of the laser and aligned with the beam. The peak power of the beam exiting aperture 260 can be used as the discriminant for this alignment step. If desired, another more sensitive test, such as a laser beam profile measurement, may be used. The GRIN may be attached to the laser exit window by depositing optical cement at the interface and letting it harden when the alignment is completed.

It is an important advantage of this invention that lateral misalignment of the GRIN with respect to the beam results only in vignetting of the beam, to the first order. In the prior art, the final misalignment (of the spatial filter) would result in substantial degradation of the beam quality because the undesired radiation in the second Airy maximum would pass through.

This insensitivity to the final alignment is an advantage with respect to cost, also. The yield is "trimmed" at the start, when the least amount of money has been spent. After the step of etching aperture 260, the concentricity of the GRIN and the aperture is measured, illustratively in the same measuring microscope. GRINs that fail the test can be rejected at this stage.

One skilled in the art would have been tempted to etch aperture 260 by first aligning GRIN rod 200 on the beam axis and then using a positive photoresist to form a developed dot of hardened resist at the beam waist. Chrome coating 250 would then be deposited on the second surface to produce a self-aligned aperture 260. Such an approach suffers from the defect that the critical step—the formation of the aperture on the axis of both the laser beam and the GRIN is performed late in the process, so that more money will have been spent on defective or below-standard GRINs than with the present invention. An alternative approach to photolithographic techniques—that of drilling a hole in layer 250 with an excimer laser—was rejected because the hole quality was not satisfactory.

An important case is that of a semiconductor laser diode. Laser diodes emit radiation in an elliptical cone of about 30 degrees, not in a collimated or nearly collimated beam. An anamorphic correction to transform that radiation to a substantially collimated beam would be advantageous in order to conserve power. The standard approach in the prior art is simply to clip the beam drastically, using only a small fraction of power near the axis.

The diverging nature of the beam can be dealt with readily in accordance with the invention by making the length of the GRIN greater than one quarter period to collimate the beam. The transformation from a beam having an elliptical cross section to one having a circular cross section can be accomplished by attaching a cylindrical lens to the exit face of the laser before attaching the GRIN. This would require a separate alignment step, which detracts somewhat from the advantages of the invention, but is still preferable to the alignment problems in the prior art. A more elegant approach is to implant the GRIN with an elliptical distribution of a conventional dopant to change the index of refraction. Such a distribution will focus radiation travelling in one plane more than that in the orthogonal plane and will produce a more symmetric azimuthal radiation distribution. The implant may be accomplished by rotating a cylindrical GRIN under an ion gun and varying the voltage as a function of azimuth. A refinement of this procedure is to vary the voltage at each azimuthal angle to produce a radial-azimuthal distribution that will provide improved focussing relative to the preceding embodiment of a layer having a fixed penetration. The quality of the focus may be adjusted to provide the beam quality required by any particular application. Even a crude compensation will be better than the prior art. An alternative to the foregoing is the use of a GRIN having an elliptical cross section, processed in the normal fashion to produce a GRIN with an axially uniform dopant distribution and an azimuthally varying distribution having different radial distributions of the short and long axes of the GRIN to provide the required anamorphic transformation. The correct dopant distribution will depend on the properties of the beam being converted, of course.

The GRIN is nominally one quarter period long, which varies with the diameter and the dopant, being 2 mm for the illustrative embodiment, with a tolerance of 0.1%. Aperture 260 is sized at a diameter of 3-4 microns for HeNe laser radiation. Different wavelength lasers will have different diameters. The diameter is set to truncate the Airy disk before the first minimum. If the laser beam is not well collimated, then the length of the GRIN will be adjusted as required. GRINs suitable for use with the invention may be obtained from NSG America, of 28 World's Fair Drive, Somerset, N.J. 08873.

Another advantage of the present invention applicable to semiconductor and other waveguide lasers is that power is conserved because radiation is coupled from the guided mode in the laser to a similar guided mode in the GRIN without being coupled to $TEM_{00}$ freespace radiation. In the prior art, such coupling was required.

It should be understood that the invention is not limited to the particular embodiments shown and described herein, but that various changes and modifications may be made without departing from the spirit and scope of this novel concept as defined by the following claims. The invention is usable with many different lasers, such as dye lasers or RF excited waveguide lasers, and visible and infrared wavelengths. The exposure step may be carried out with either positive or negative masks of the aperture, and corresponding photoresists.

What is claimed is:

1. A system for generating a diverging optical beam at a predetermined laser wavelength and having a substantially spherical wavefront, comprising a laser light source for generating an optical beam travelling along a beam axis;

a converging lens disposed to intercept said optical beam and focus it to a beam waist at a predetermined axial position along said beam axis; and an aperture plate having an aperture of predetermined diameter disposed along said beam axis at said predetermined axial position, said predetermined diameter being sized to pass a predetermined portion of said beam, whereby a beam having a substantially spherical wavefront diverges from said aperture, characterized in that:

said laser generates an optical beam in a predetermined laser waveguide mode and has an emitting face for emitting said laser beam;

said converging lens is a gradient index refractive lens having a first surface oriented toward said laser, a second surface oriented toward said aperture plate, a predetermined radially varying index of refraction gradient, a predetermined rod length, and a predetermined focal length at said laser wavelength substantially equal to said predetermined rod length, whereby said beam waist is located along said axis substantially at said second surface;

said aperture plate is a film of material substantially opaque at said laser wavelength, fixedly attached to said second surface; and said system further includes coupling means disposed between said emitting face and said first surface, for coupling radiation from said predetermined laser waveguide mode to a guided mode within said gradient index refractive lens and for suppressing reflections off said first surface, said coupling means being bonded to said emitting surface and to said first surface.

2. A system according to claim 1, further characterized in that said laser is a semiconductor laser generating a beam having an energy distribution having an elliptical cross section perpendicular to said beam axis; and said gradient index refractive lens has a first portion adjacent said laser having an azimuthally varying index of refraction adapted for performing an anamorphic conversion of beam radiation from an elliptical cross section to a circular cross section.

3. A system according to claim 2, further characterized in that said first portion of said gradient index refractive lens has a circular material cross section and an azimuthally varying index of refraction in a first axial portion adjacent said emitting face and extending a predetermined anamorphic conversion length along said beam axis from said emitting face whereby said first axial portion performs said anamorphic conversion.

4. A system according to claim 2, further characterized in that said gradient index refractive lens has a substantially elliptical cross section along at least a predetermined axial length of said rod length and a predetermined azimuthal index of refraction distribution having a first radial index distribution on a short axis of said predetermined axial length and a second radial index of distribution on a long axis of said predetermined axial length, said first and second radial index distributions being related such that an elliptical cross section beam is converted to a circular cross section beam.

5. A system for generating a diverging optical beam at a predetermined laser wavelength and having a substantially spherical wavefront comprising a laser light source for generating an optical beam travelling along a beam axis;

a converging lens disposed to intercept said optical beam and focus it to a beam waist at a predetermined axial position along said beam axis; and an aperture plate having an aperture of predetermined diameter disposed along said beam axis at said predetermined axial position, said predetermined diameter being sized to pass a predetermined portion of said beam, whereby a beam having a substantially spherical wavefront diverges from said aperture, characterized in that:

said laser generates an optical beam and has an emitting face for emitting said laser beam;

said converging lens is a gradient index refractive lens having a first surface oriented toward said laser, a second surface oriented toward said aperture plate, a predetermined radially varying index of refraction gradient, a predetermined rod length, and a predetermined focal length at said laser wavelength substantially equal to said predetermined rod length, whereby said beam waist is located along said axis substantially at said second surface;

said aperture plate is a film of material substantially opaque at said laser wavelength, fixedly attached to said second surface and having an aperture formed in place and aligned with said beam axis within a predetermined aperture tolerance;

said system further includes coupling means disposed between said emitting face and said first surface, for coupling radiation from said laser emitting face into said gradient index refractive lens and for suppressing reflections off said first surface, said coupling means being bonded to said emitting face and to said first surface; and said gradient refractive index lens is aligned with said optical beam after said aperture is formed in place, whereby said gradient index refractive lens only vignettes said optical beam through misalignment.

* * * * *